(12) United States Patent
Satou et al.

(10) Patent No.: US 7,646,892 B2
(45) Date of Patent: Jan. 12, 2010

(54) IMAGE INSPECTING APPARATUS, IMAGE INSPECTING METHOD, CONTROL PROGRAM AND COMPUTER-READABLE STORAGE MEDIUM

(75) Inventors: Tetsuya Satou, Nara (JP); Toshimasa Kuchii, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 771 days.

(21) Appl. No.: 11/266,589

(22) Filed: Nov. 4, 2005

(65) Prior Publication Data

US 2006/0126136 A1    Jun. 15, 2006

(30) Foreign Application Priority Data

Nov. 5, 2004    (JP)    ............... 2004-322956

(51) Int. Cl.
   G06K 9/00    (2006.01)
   G06K 9/40    (2006.01)
(52) U.S. Cl. ........................... 382/112; 382/275
(58) Field of Classification Search ............... 382/112, 382/275

See application file for complete search history.

(56) References Cited

U.S. PATENT DOCUMENTS 4,926,251 A * 5/1990 Sekizawa et al. ............ 358/535
5,293,543 A   3/1994 Okabe
6,320,981 B1 * 11/2001 Yada ..................... 382/168

FOREIGN PATENT DOCUMENTS

| JP | 3-97074 A | 4/1991 |
|----|-----------|--------|
| JP | 3-97075 A | 4/1991 |
| JP | 3-258092 A | 11/1991 |
| JP | 4-258736 A | 9/1992 |
| JP | 5-102451 A | 4/1993 |
| JP | 6-244396 A | 9/1994 |
| JP | 7-117571 B2 | 12/1995 |
| JP | 9-259281 | 10/1997 |
| JP | 10-257381 | 9/1998 |

OTHER PUBLICATIONS

Chinese Office Action dated Dec. 8, 2006 for corresponding Chinese patent application (and at least partial translation).
Japanese Office Action mailed May 8, 2008 in corresponding Japanese application 2004-322956.

* cited by examiner

*Primary Examiner*—Brian P Werner
*Assistant Examiner*—Randolph Chu
(74) *Attorney, Agent, or Firm*—Nixon & Vanderhye P.C.

(57) ABSTRACT

An image inspecting apparatus invention includes an original image storing memory 21 for storing an image data output from an image sensor 11, a filtering processing section 22 for obtaining a shading component-removed data in which the shading component is removed from the output image data, a preliminary processing memory 23 for storing the shading component-removed data, a block dividing/adding section 24 for dividing the shading component-removed data into blocks with a size of n×m and adding the shading component-removed data within the divided blocks to obtain a block divided/added data, a secondary processing memory 25 for storing the block divided/added data, a statistics processing section 26 for calculating an average value, a maximum value and a minimum value for the block divided/added data, a quality determining section 27 for determining a quality with the calculated average value, maximum value and minimum value and a determination result storing memory 28 for storing information for the block which has been determined.

14 Claims, 13 Drawing Sheets

| | 1 | |
|---|---|---|
| 1 | -4 | 1 |
| | 1 | |

(b)

| 1 | 1 | 1 |
|---|---|---|
| 1 | -8 | 1 |
| 1 | 1 | 1 |

FIG.4

```
for (row = TeoYstart (src) + 1; row <= TeoYend (src) - 1; row++) {
    for (col = TeoXstart (src) + 1; col <= TeoXend (src) - 1; col++) {
        ...
    }
}
```

FIG.7

| 2408 | 2450 | 2392 | 2376 | 2350 | 2410 | 2358 | 2404 | 2444 | 2428 |
|------|------|------|------|------|------|------|------|------|------|
| 2352 | 2374 | 2422 | 2326 | 2334 | 2396 | 2344 | 2426 | 2446 | 2374 |
| 2378 | 2470 | 2400 | 2388 | 2380 | 2424 | 2368 | 2384 | 2370 | 2408 |
| 2400 | 2424 | 2398 | 2358 | 2368 | 2348 | 2344 | 2344 | 2364 | 2338 |
| 2416 | 2362 | 2360 | 2396 | 2460 | 2408 | 2368 | 2404 | 2368 | 2366 |
| 2350 | 2380 | 2448 | 2374 | 2384 | 2402 | 2348 | 2338 | 2334 | 2368 |
| 2386 | 2440 | 2378 | 2366 | 2408 | 2350 | 2368 | 2372 | 2406 | 2434 |
| 2408 | 2382 | 2432 | 2364 | 2338 | 2356 | 2350 | 2400 | 2384 | 2352 |
| 2354 | 2376 | 2424 | 2402 | 2386 | 2340 | 2460 | 2396 | 2384 | 2420 |
| 2408 | 2374 | 2418 | 2376 | 2362 | 2318 | 2404 | 2276 | 2374 | 2374 |

FIG.9

| 66 | 41 | 0 | 18 | 44 | 52 | 36 | 26 | 22 | 5 |
|----|----|---|----|----|----|----|----|----|---|
| 33 | 33 | 4 | 55 | 71 | 40 | 27 | 3 | 12 | 12 |
| 40 | 33 | 2 | 8 | 25 | 7 | 57 | 65 | 57 | 28 |
| 49 | 53 | 32 | 19 | 4 | 5 | 15 | 21 | 32 | 36 |
| 39 | 73 | 10 | 42 | 48 | 21 | 24 | 18 | 54 | 80 |
| 14 | 21 | 36 | 36 | 57 | 24 | 25 | 60 | 80 | 22 |
| 26 | 30 | 13 | 17 | 10 | 61 | 35 | 9 | 36 | 13 |
| 44 | 60 | 45 | 24 | 45 | 15 | 33 | 31 | 28 | 29 |
| 29 | 37 | 13 | 34 | 27 | 2 | 2 | 4 | 17 | 8 |
| 22 | 56 | 36 | 29 | 15 | 13 | 12 | 38 | 23 | 69 |

FIG.11

| 11888 | 12462 | 11855 | 12347 | 12120 | 13940 | 10217 | 11911 | 12162 | 11992 | 14102 | 12060 | 11197 | 11381 |
|---|---|---|---|---|---|---|---|---|---|---|---|---|---|
| 12040 | 11492 | 11593 | 12580 | 12062 | 12929 | 11436 | 12957 | 15094 | 12998 | 13847 | 11632 | 12870 | 12161 |
| 12323 | 10973 | 12080 | 12211 | 13056 | 12808 | 14017 | 12751 | 24021 | 12197 | 13713 | 11188 | 10816 | 12484 |
| 11690 | 12559 | 12482 | 12374 | 11755 | 12165 | 12216 | 12673 | 16678 | 11940 | 13355 | 12355 | 13240 | 13358 |
| 11164 | 12030 | 11105 | 11748 | 12612 | 11898 | 11854 | 11683 | 11393 | 21452 | 11205 | 10539 | 12240 | 11819 |
| 11073 | 12495 | 11994 | 11940 | 10964 | 12028 | 12452 | 11367 | 12255 | 15689 | 12390 | 12778 | 11401 | 12232 |
| 11377 | 10949 | 12181 | 11626 | 11472 | 10422 | 11384 | 10791 | 11265 | 12203 | 11553 | 11341 | 11270 | 12074 |
| 10765 | 12743 | 11457 | 11321 | 10296 | 11601 | 11366 | 11280 | 10945 | 11421 | 11299 | 11355 | 12453 | 10586 |
| 10993 | 11795 | 11899 | 11619 | 11404 | 10950 | 11871 | 11184 | 11796 | 9716 | 11740 | 10432 | 11822 | 11057 |
| 10879 | 12078 | 11254 | 12122 | 12037 | 11062 | 11227 | 11213 | 11343 | 11917 | 12398 | 11427 | 11404 | 10996 |
| 10921 | 11398 | 11377 | 11276 | 10687 | 11535 | 11805 | 12125 | 11516 | 11099 | 11731 | 12130 | 12275 | 10996 |
| 12680 | 11267 | 11073 | 11761 | 11752 | 11544 | 10752 | 11166 | 11632 | 11112 | 12507 | 11606 | 11442 | 11462 |

IMAGE INSPECTING APPARATUS, IMAGE INSPECTING METHOD, CONTROL PROGRAM AND COMPUTER-READABLE STORAGE MEDIUM

This Nonprovisional application claims priority under 35 U.S.C. §119(a) on Patent Application No. 2004-322956 filed in Japan on Nov. 5, 2004, the entire contents of which are hereby incorporated by reference.

BACKGROUND

1. Field of the Technology

The technology presented herein relates to an image inspecting apparatus such as an image inspecting apparatus for determining a quality for an image data output from an image sensor (e.g. CCD (Charge Coupled Device)), an image inspecting method using the image inspecting apparatus, a control program for making a computer to execute a processing procedure implementing the image inspecting method and a computer-readable storage medium stored thereon the control program.

2. Description of the Related Art

Conventionally, an image sensor, such as a CCD array, functioning as an image input apparatus is constructed of a large number of pixels (more than several million pixels) which are arranged in two dimensions by applying a semiconductor manufacturing technique. The image sensor goes through many manufacturing steps until its completion. Various flaws occur in the image sensor as a result from defects in the manufacturing steps.

One such defect is "inconsistencies in display characteristics". The "inconsistencies in display characteristics" are referred to as a luminance change generated by having a certain amount of area on a display screen. The "inconsistencies in display characteristics" are broadly classified into two "inconsistencies in display characteristics". One of the above-mentioned categories is "inconsistencies in display characteristics" gently changing over a wide range of an entire display (hereinafter, referred to as "shading"). The other is "inconsistencies in display characteristics" locally changing (hereinafter, referred to as "inconsistencies in luminance characteristics").

The "shading" gradually changes from a center portion to a peripheral portion of an image. Therefore, in many cases, when vied only with the naked eye, it is determined that "inconsistencies in display characteristics" do not exist. On the other hand, the "inconsistencies in luminance characteristics" area local luminance change. Thus, it is determined to be a defect, and is obvious to anyone depending on the size of the "inconsistencies in luminance characteristics" and an amount of change thereof.

Conventionally, in a testing apparatus for testing a quality of an image sensor having such "inconsistencies in luminance characteristics", the following processes are performed so as to determine a quality for the image sensor.

First, an image data output from an image sensor is captured into a testing apparatus. Filtering, such as an average filtering or a two dimensional median filtering, etc, is performed to obtain noise-removed image data in which noise containing a component relating to "inconsistencies in display characteristics" component is removed from the image data.

Next, a difference between the noise-removed image data and the original output image data is calculated to separate the "inconsistencies in display characteristics" component. The concentration of pixels containing the "inconsistencies in display characteristics" is digitized by using an arbitrary threshold value, and a labeling process is performed on the digitized data. Thereafter, a quality for the "inconsistencies in luminance characteristics" is determined depending on a size of a labeled area.

Herein, the two dimensional median filtering is referred to as a noise removing process where an observing window is constructed of a plurality of pixels arranged in the two dimensional manner with a pixel of interest at its center and a concentration value of the pixel of interest is replaced with the center value of the concentration of pixel contained within the observing window.

The labeling process is referred to as a process where a labeling is performed on a pixel for the digitized image data which exceeds a threshold value and the same label is attached to its adjacent pixel in the case where the adjacent pixel also exceeds the threshold value.

However, with the above-described conventional technique, there is a problem that it takes too much time to perform the noise removing process and the labeling process. When the processing time is shortened, there is a problem that the precision for the labeling process decreases.

In order to solve such problems, in a conventional image information processing apparatus disclosed in, for example, Reference 1, precision maintenance as well as reduction of processing time are realized in a noise removing process by combining a median filtering in a horizontal direction (H) and a median filtering in a vertical direction (V), which are a one dimensional filtering, not a two dimensional median filtering. Furthermore, in the image information processing apparatus disclosed in Reference 1, a unique function is used to improve a determining precision in order to determine a quality of "inconsistencies in luminance characteristics".

[Reference 1] Japanese Laid-Open Publication No. 09-259281

As described above, since the average filtering or the two dimensional median filtering, etc, is used for the noise removing process, there is a problem that it takes much time for the noise removing process with the conventional technique. Furthermore, since it is necessary to digitize the concentration of pixels containing "inconsistencies in display characteristics" component with an arbitrary threshold value and perform a labeling process on the digitized data in order to determine a quality of "inconsistencies in luminance characteristics". Therefore, there is a problem that it also takes much time to perform the labeling process. Moreover, there is a problem that the precision for the labeling process decreases when the processing time is shortened.

On the other hand, in the image information processing apparatus of Reference 1, precision maintenance as well as reduction of processing time are achieved by combining one dimensional median filterings and improvement of the determining precision is designed by using the unique function in order to determine a quality of the "inconsistencies in luminance characteristics". However, the labeling process is performed as conventional Thus, when a large area or a large number of "inconsistencies in luminance characteristics" is found, there is a problem that it takes much time to perform the labeling process.

The example embodiment presented herein solves such conventional problems and is designed to improve the detection precision for "inconsistencies in luminance characteristics" for an image data output from an image sensor regardless of a size of area and the number of the "inconsistencies in luminance characteristics". The example embodiment provides an image inspecting apparatus capable of determining a quality (evaluation) by accurately and quantitatively detecting the "inconsistencies in luminance characteristics" at a high speed, an image inspecting method using the same, a control program for instructing a computer to perform each processing procedure for the method and a computer-readable storage medium for storing the same.

As described above, since the average filtering or the two dimensional median filtering, etc, is used for the noise removing process, there is a problem that it takes much time for the noise removing process with the conventional technique. Furthermore, since it is necessary to digitize the concentration of pixels containing "inconsistencies in display characteristics" component with an arbitrary threshold value and perform a labeling process on the digitized data in order to determine a quality of "inconsistencies in luminance characteristics". Therefore, there is a problem that it also takes much time to perform the labeling process. Moreover, there is a problem that the precision for the labeling process decreases when the processing time is shortened.

On the other hand, in the image information processing apparatus of Reference 1, precision maintenance as well as reduction of processing time are achieved by combining one dimensional median filterings and improvement of the determining precision is designed by using the unique function in order to determine a quality of the "inconsistencies in luminance characteristics". However, the labeling process is performed as conventional. Thus, when a large area or a large number of "inconsistencies in luminance characteristics" is found, there is a problem that it takes much time to perform the labeling process.

The example embodiment solves such conventional problems and is designed to improve the detection precision for "inconsistencies in luminance characteristics" for an image data output from an image sensor regardless of a size of area and the number of the "inconsistencies in luminance characteristics". The example embodiment provides an image inspecting apparatus capable of determining a quality (evaluation) by accurately and quantitatively detecting the "inconsistencies in luminance characteristics" at a high speed, an image inspecting method using the image inspecting apparatus, a control program for making a computer to execute a processing procedure implementing the image inspecting method and a computer-readable storage medium stored thereon the control program.

SUMMARY

An image inspecting apparatus according to an example embodiment presented herein for determining a quality for an image output from an image sensor includes a block dividing/adding section for dividing the image data output from the image sensor into blocks (one or a plurality of blocks) with a predetermined size of n×m (where m and n are natural numbers) and adding the data (respective data for each block) within the divided blocks to obtain a block divided/added data; a statistics processing section for calculating an average value, a maximum value and a minimum value for the block divided/added data; and a quality determining section for determining a quality for the image data output from the image sensor based on the average value, the maximum value and the minimum value for the block divided/added data calculated by the statistics processing section, thereby the above-described objective being achieved.

An image inspecting apparatus according to the example embodiment preferably further includes a filtering processing section for obtaining a shading component-removed data in which the shading component is removed from the image data output from the image sensor, prior to the block dividing/adding section and wherein the block dividing/adding section divides the shading component-removed data into respective blocks with a predetermined size of n×m (where m and n are natural numbers) and adds the shading component-removed data within the divided blocks to obtain a block divided/added data.

An image inspecting apparatus according to the example embodiment for determining a quality for an image data output from an image sensor includes an original image storing memory for storing the image data output from the image sensor; a filtering processing section for obtaining a shading component-removed data in which the shading component is removed from the output image data stored in the original image storing memory; a preliminary processing memory for storing the shading component-removed data obtained by the filtering processing section; a block dividing/adding section for dividing the shading component-removed data stored in the preliminary processing memory into blocks (one or a plurality of blocks) with a predetermined size of n×m (where m and n are natural numbers) and adding the shading component-removed data (respective data for each block) within the divided blocks to obtain a block divided/added data; a secondary processing memory for storing the block divided/added data obtained by the block dividing/adding section; a statistics processing section for calculating an average value, an maximum value and an minimum value for the block divided/added data stored in the secondary processing memory; a quality determining section for determining a quality for the image data output from the image sensor based on the average value, the maximum value and the minimum value for the block divided/added data calculated by the statistics processing section; and a determination result storing memory for storing information about the block which has been determined by the quality determining section, thereby the above-described objective being achieved.

Furthermore, the filtering process section of an image inspecting apparatus according to the example embodiment preferably obtains the shading component-removed data with any one of a differential filtering with a central difference in a horizontal direction, a differential filtering with a central difference in a vertical direction, a 4-coefficient laplacian filtering, an 8-coefficient laplacian filtering and a differential filtering with a central difference in three directions.

Furthermore, the quality determining section of an image inspecting apparatus according to the example embodiment preferably determines a quality for the image sensor with $$(Max-Ave)/(Ave-Min) > limit\_1$$

where Max: maximum value for the block divided/added data, Min: minimum value for the block divided/added data, Ave: average value for the block divided/added data, and limit_1: threshold value for determining the quality.

Furthermore, the quality determining section of an image inspecting apparatus according to the example embodiment preferably determines a quality for the block with $$(Blk-Ave)/(Ave-Min) > limit\_2$$

where Blk: the block divided/added data for an arbitrary block, Min: minimum value for the block divided/added data, Ave: average value for the block divided/added data, and limit_2: threshold value for determining the quality.

Furthermore, the threshold value for determining the quality in the image inspecting apparatus according to the example embodiment is preferably within a range from 1.5 to 2.5.

An image inspecting method according to the example embodiment for determining a quality for an image data output from an image sensor includes a block dividing/adding step for dividing the image data output from the image sensor into blocks (one or a plurality of blocks) with a predetermined size of n×m (where m and n are natural numbers) and adding the data (respective data for each block) within the divided blocks to obtain a block divided/added data; a statistics processing step for calculating an average value, a maximum value and a minimum value for the block divided/added data; and a quality determining step for determining a quality for the image data output from the image sensor with the average value, the maximum value and the minimum value for the block divided/added data, thereby the above-described objective being achieved.

An image inspecting apparatus according to the example embodiment preferably further includes a filtering processing step for obtaining a shading component-removed data in which the shading component is removed from the image data output from the image sensor, prior to the block dividing/adding step and wherein the block dividing/adding step divides the shading component-removed data into respective blocks with a predetermined size of n×m (where m and n are natural numbers) and adds the shading component-removed data within the divided blocks to obtain a block divided/added data.

A control program according to the example embodiment is a program for making a computer to execute a processing procedure implementing the image inspecting method described above, thereby the above-described objective being achieved.

A readable storage medium according to the example embodiment is a computer-readable storage medium stored thereon the control program described above, thereby the above-described objective being achieved.

Hereafter, effects of the example embodiment with the above features will be described.

In an image inspecting apparatus for performing an image processing for an image data output form an image sensor, for example, CCD, etc according to the example embodiment, first, a "shading" which gently changes in luminance over a wide range of an entire screen is removed by performing a filtering process to obtain a shading component-removed data in which the "inconsistencies in luminance characteristics" are emphasized. In the filtering process, for example, a differential filtering with a central difference in a horizontal direction, a differential filtering with a central difference in a vertical direction, a 4-coefficient laplacian filtering, an 8-coefficient laplacian filtering or a differential filtering with a central difference in three directions, etc, is used to perform a differentiaion between adjacent output image data, thereby an amount of change in luminance between image data being obtained. In the "shading", the amount of change is so small as to be ignored when compared to the "inconsistencies in luminance characteristics". Therefore, by obtaining an absolute value of the amount of change in luminance with the differentiation between the adjacent output image data, the "shading" can be removed. In the case of the data which does not contain the shading component, the filtering process is not required.

Next, the shading component-removed data is divided into respective blocks with n×m and thereafter, the shading components within the respective divided blocks are added to obtain a block divided/added data by a block dividing/adding section.

The "inconsistencies in luminance characteristics" are found over a certain amount of area or more and has a certain amount of local change in luminance. Therefore, if the "inconsistencies in luminance characteristics" are found in the divided blocks, the block divided/added data for the block has a larger value than that of a block in which the "inconsistencies in luminance characteristics" are not found. Between the blocks where the "inconsistencies in luminance characteristics" are not found, the change in luminance within the blocks so small that there is no significant difference in the block divided/added data to each other. Thus, a distribution for the block divided/added data where the "inconsistencies in luminance characteristics" are not found is formed so as to be close to a normal distribution. A distribution for the block divided/added data where the "inconsistencies in luminance characteristics" are found is formed such that the minimum value for the block divided/added data is closer to an average value than the maximum value for the block divided/added data is.

The average value, the maximum value and the minimum value for the block divided/added data is calculated by a statistics processing section. The difference between the maximum value and the average value, and the difference between the minimum value and the average value are compared by a quality determining section and/or the difference between the added data for the blocks and the average data for the block divided/added data, and the difference between the minimum value for the block divided/added data and the average data for the block divided/added data are compared to determine a quality for an image sensor and/or determine a quality for each block (extraction of poor quality blocks).

For example, in order to determine a quality for the image sensor, the ratio of the "difference between an average value Ave and a maximum value Max" and the "difference between the average value Ave and a minimum value Min" are calculated. When the ratio of the two differences exceeds an arbitrary multiple (quality threshold value: limit_1) as shown in the following expression 1, the image sensor is determined to be a poor quality.

$$(\text{Max}-\text{Ave})/(\text{Ave}-\text{Min}) > \text{limit}\_1 \quad \text{(expression 1)}$$

Max: Maximum value
Min: Minimum value
Ave: Average value
limit_1: Quality threshold value In order to extract a poor quality block (damaged area), the "difference between an added data for an arbitrary block Blk and an average value Ave for the added data" and the "difference between the average value Ave for the added data and a minimum value Min for the added data" are calculated. When the ratio of the "difference between the added data for the arbitrary block Blk and the average value Ave for the added data" and the "difference between the average value Ave for the added data and the minimum value Min for the added data" exceeds an arbitrary multiple (Quality threshold value: limit_2) as shown in the following expression 2, the arbitrary block is determined to be of poor quality.

$$(\text{Blk}-\text{Ave})/(\text{Ave}-\text{Min}) > \text{limit}\_2 \quad \text{(expression 2)}$$

Blk: Added data for the block
Max: Maximum value for the added data
Min: Minimum value for the added data
Ave: Average value for the added data
limit_2: Quality threshold value (damaged area)

The quality threshold values limit_1 and limit_2 are calculated from the correlation between the image of the object obtained by the imaging device and the result of observing the objects with eyes. However, the quality threshold values limit_1 and limit_2 are preferably within a range from 1.5 to 2.5. More preferably, the quality threshold values limit_1 and limit_2 are a value of 2. When the quality threshold values limit_1 and limit_2 are smaller than 1.5, there is an increasing probability that an image sensor or a block with a "good quality" is determined to be a "poor quality". When the quality threshold values limit_1 and limit_2 are larger than 2.5, there is an increasing probability that an image sensor or a block with a "poor quality" is determined to be a "good quality".

In this manner, in the example embodiment presented herein, "inconsistencies in luminance characteristics" for an image data output from an image sensor are accurately and quantitatively detected at a high speed to determine if it is in an acceptable range, irrespective of a size of area and the number of the "inconsistencies in luminance characteristics" by using a simple statistics processing without performing a labeling processing.

These and other advantages of the example embodiment presented herein will become apparent to those skilled in the art upon reading and understanding the following detailed description with reference to the accompanying figures.

BRIEF DESCRIPTION OF THE DRAWINGS

FIG. 3(a) is a diagram showing an example of a 4-coefficient laplacian filtering.

FIG. 3(b) is a diagram showing an example of an 8-coefficient laplacian filtering.

FIG. 4 is a diagram showing an example of a control program used to obtain an output image having the same size as an input image in the image inspecting apparatus according to an embodiment.

FIG. 7 is a diagram showing an example of an image data output from an image sensor.

FIG. 9 is a diagram showing an example of (a portion of) a shading component-removed data after a filtering process is performed with a "differential filtering with a central difference in horizontal direction (4 coefficient)".

FIG. 11 is a diagram showing an example of a block divided/added data where the shading component-removed data is divided into blocks with a size of 20×20.

Figure 1:
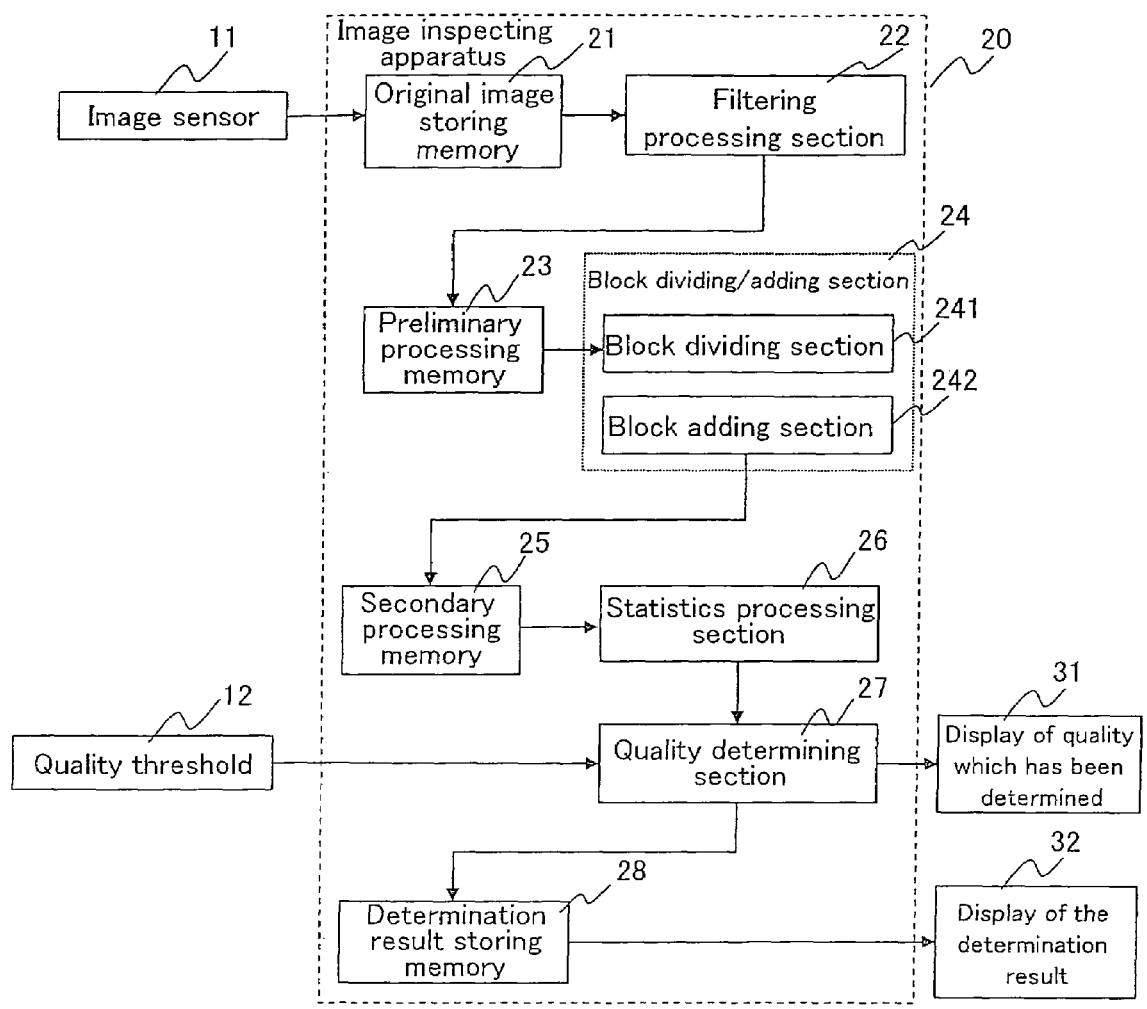
FIG. 1 is a block diagram showing an exemplary structure of an image inspecting apparatus according to an embodiment.

11 image sensor
12 quality threshold
20 image inspecting apparatus
21 original image storing apparatus
22 filtering processing section
23 preliminary processing section
24 block dividing/adding section
241 block dividing section
242 block adding section
25 secondary processing section
26 statistics processing section
27 quality determining section
28 determination result storing section
31 display in which a quality has been determined
32 display of the determination result
41 CPU
42 ROM
43 RAM
44 input section
45 output section

DESCRIPTION OF THE PREFERRED EMBODIMENTS

Hereafter, embodiments of an image inspecting apparatus will be described with reference to the accompanying figures.

FIG. 1 is a block diagram showing an exemplary structure of an image inspecting apparatus, which is one embodiment.

In FIG. 1, an image inspecting apparatus 20 includes an original image storing memory 21, a filtering processing section 22, a primary processing memory 23, a block dividing/adding section 24, a secondary processing memory 25, a statistics processing section 26, a quality determining section 27 and a determination result storing memory 28.

An image data output from an image sensor 11 is stored in the original image storing memory 21. In the image inspecting apparatus 20, the image sensor 11 intended for an inspection is a CCD. First, an output image data (luminance information) is obtained via a CCD output terminal when an arbitrary amount of light is input to the CCD. Thereafter, the obtained output image data is stored in the original image storing memory 21.

A shading component-removed data in which the shading component is removed from the output image data stored in the original image storing memory 21 is obtained by the filtering processing section 22. The change of amount in luminance between the image data in the shading is smaller than that of inconsistencies in luminance characteristics. Thus, the absolute value of the amount of change in luminance between adjacent image data is obtained to remove the shading, thereby the data in which the "inconsistencies in luminance characteristics" are emphasized being obtained.

The shading component-removed data obtained by the filtering processing section 22 is stored in the preliminary processing memory 23.

The block dividing/adding section 24 includes a block dividing section 241 and a block adding section 242. The block dividing section 241 divides the shading component-removed data stored in the preliminary processing memory 23 into blocks with a predetermined size of n×m (where m and n are natural numbers). The block adding section 242 calculates a block dividing/adding data by adding the shading component-removed data within the blocks which are divided by the block dividing section 241.

The block divided/added data obtained by the block dividing/adding section 24 is stored in the secondary processing memory 25.

An average value, a maximum value and a minimum value for the block divided/added data stored in the secondary processing memory 25 is calculated by the statistics processing section 26.

A quality for the image data output from the image sensor 11 is determined by the quality determining section 27 with the average value, the maximum value and the minimum value for the block divided/added data.

Information about the block, which has been determined, obtained by the quality determining section 27 is stored in the determination result storing memory 28.

With the above-described features, the shading component is removed by the filtering processing section 22. The shading component-removed data is divided into respective blocks with a predetermined size and the data within the respective blocks is added by the block dividing/adding section 24. The average value, the maximum value and the minimum value for the block divided/added data are calculated by the statistics processing section 26. The quality for the image data output from the image sensor 11 is determined by the quality determining section 27.

In determining a quality of the output image data, the inconsistencies in luminance characteristics are found over a certain amount of area or more and have a certain amount of local change in luminance. Thus, the value for the added data for the block where the inconsistencies in luminance characteristics are found is larger than that of the blocks where the inconsistencies in luminance characteristics are not found. Therefore, the added data for the blocks where the inconsistencies in luminance characteristics are not found is formed so as to be close to the normal distribution. The minimum value for the added data for the block where the inconsistencies in luminance characteristics are found is closer to the average value than the maximum value is. Thus, the average value, the maximum value and the minimum value for the added data are calculated, and the difference between the maximum value and the average value and the difference between the minimum value and the average value are compared to determine a quality for the image sensor 11 or the divided blocks (detection of defect product) without performing a labeling process.

Figure 2:
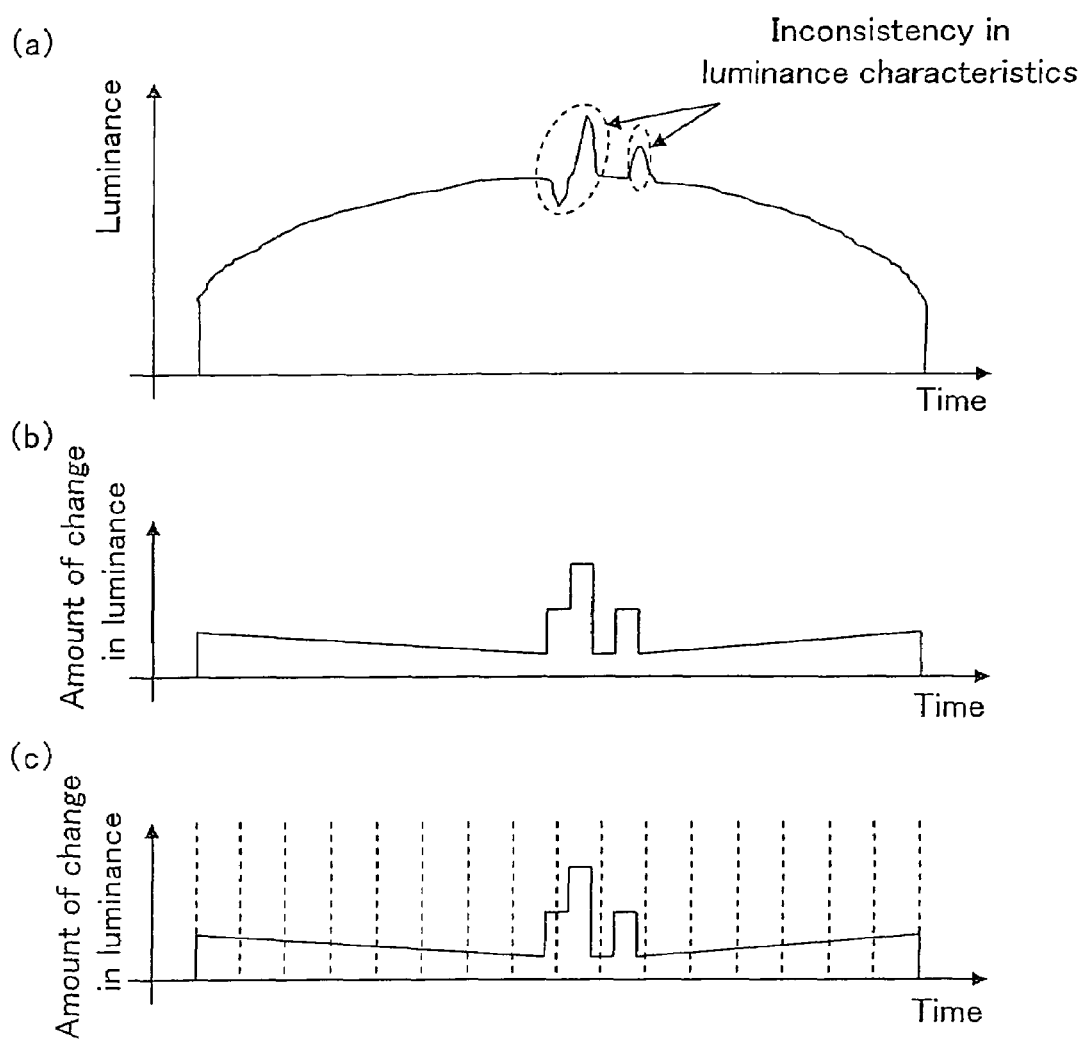
FIG. 2(a) is a signal waveform chart showing one example of one line in a vertical direction for the obtained output image data.
FIG. 2(b) is a signal waveform chart showing a shading component-removed data after a differential filtering process is with a central difference in a horizontal direction is performed on the output image data in FIG. 2(a).
FIG. 2(c) is a signal waveform chart showing an image example, in which the shading component-removed data in FIG. 2(b) is divided into respective blocks with a predetermined size.

Each structure mentioned above will be described in further details. FIGS. 2(*a*) and 2(*b*) show a process of removing a shading component by the filtering process section 22. FIG. 2(*c*) shows a process of dividing the shading component-removed data by the block dividing/adding section 24.

FIG. 2(*a*) is a signal waveform chart showing one example for one line of pixels in a vertical direction for the obtained output image data. In FIG. 2(*a*), a vertical axis and horizontal axis respectively represent a luminance and time. Inconsistencies in luminance characteristics are found in portions surrounded by dashed lines.

The shading component-removed data in FIG. 2(*b*), in which the "inconsistencies in luminance characteristics" are emphasized, is extracted from the output image data stored in the original image storing memory 21 in FIG. 2(*a*) by the filtering processing section. Specifically, a low frequency component (shading) is removed from the obtained output image data in FIG. 2(*a*) to extract a high frequency component (point defect and inconsistencies in luminance characteristics). In order to achieve this, a differential filtering (first derivative filtering) for calculating an amount of change in luminance or a laplacian filtering for extracting an outline (second derivative filtering), etc, is used for emphasizing the high frequency component.

Typical filters used as the filtering processing section include a differential filtering with a central difference in a horizontal direction, a differential filtering with a central difference in a vertical direction, a 4-coefficient laplacian filtering, an 8-coefficient laplacian filtering and a differential filtering with a central difference in three directions.

Herein, the first derivative filtering extracts an edge (outline) for the inconsistencies in luminance characteristics with a differential in an X direction and a differential in a Y direction. The laplacian filtering is performed to sharpen an image and to detect an edge with the second derivative. The second derivative for the image is determined as follows.

B(x, y) is a pixel of interest. Differences between a pixel B and its adjacent pixel A, and between the pixel B and its adjacent pixel C are respectively $f_x(B-A)$ and $f_x(C-B)$. These are represented by $$f_x(B-A)=I(x, y)-I(x-1, y)$$

$$f_x(C-B)=I(x+1, y)-I(x, y),$$

where I(x, y) is a pixel value at point (x, y).

A second derivative for the pixel B is calculated as a difference of the first derivative value with $$f_{xx}(x, y)=f_x(C-B)-f_x(B-A)=I(x-1, y)+I(x+1, y)-2I(x, y).$$

In view of a differential in the vertical direction at the same time, the second derivative for the pixel B is given by $$\nabla^2 f(x,y)=I(x-1, y)+I(x+1, y)+I(x, y-1)+I(x, y+1)-4I(x, y) \quad \text{(expression 3)}$$

FIG. 3(*a*) shows an example of a 4-coefficient laplacian filtering in which the coefficient for each pixel in the above expression 3 is represented so as to be matched with the arrangement of each pixel. FIG. 3(*b*) shows an example of an 8-coefficient laplacian filtering in which a differential in an oblique direction is further considered besides the 4-coefficient laplacian filtering. These coefficients are called mask or kernel.

In the filtering process, not only limited to the laplacian filtering, it is also important to consider the range in which images may be processed. For example, the filtering process for pixels at an end of images for which adjacent pixels do not exist can not be performed by the above-described laplacian filtering. Therefore, it is necessary to pay attention to an initial value and a final value for a loop for accessing each pixel.

FIG. 4 shows an example of programming when an output image having the same size as an input image is obtained.

Next, the shading component-removed data after the filtering process by the filtering process section 22 is stored in the preliminary processing memory 23.

FIG. 2(*b*) is a signal waveform chart showing the shading component-removed data after the filtering process is performed with a differential filtering with a central difference in a horizontal direction on the output image data in FIG. 2(*a*). In FIG. 2(*b*), a vertical axis and a horizontal axis respectively represent an amount of change in luminance and time.

Next, the shading component-removed data stored in the preliminary processing memory 23 is divided into blocks with a predetermined size of n×m pixels by the block adding/dividing section 241.

FIG. 2(*c*) is a signal waveform chart showing an illustration, in which the shading component-removed data in FIG.

2(*b*) is divided into respective blocks with a predetermined size. In FIG. 2(*c*), a vertical axis and a horizontal axis respectively represent an amount of change in luminance and time.

Next, the shading component-removed data within the respective blocks are added by the block adding section 242. Thereafter, the obtained block divided/added data is stored in the secondary memory 25.

Furthermore, an average value Ave, a maximum value Max and a minimum value Min for the block divided/added data are calculated by the statistics processing section 26.

Furthermore, a quality determining process is performed by the quality determining section 27 with the calculated average value Ave, the calculated maximum value Max, the calculated minimum value Min and the value limit_2 of the quality threshold 12.

Specifically, the "inconsistencies in luminance characteristics" from the image data output from the image sensor 11 are detected by the quality determining section 27 with the following expression.

$$(Blk-Ave)/(Ave-Min) > \text{limit\_2} \quad \text{(expression 2)}$$

Blk: added data for an arbitrary block
Max: maximum value for the added data
Min: minimum value for the added data
Ave: average value for the added data
limit_2: value of the quality threshold 12.

The quality determination result for each divided block is stored in the determination result storing memory 28.

Figure 5:
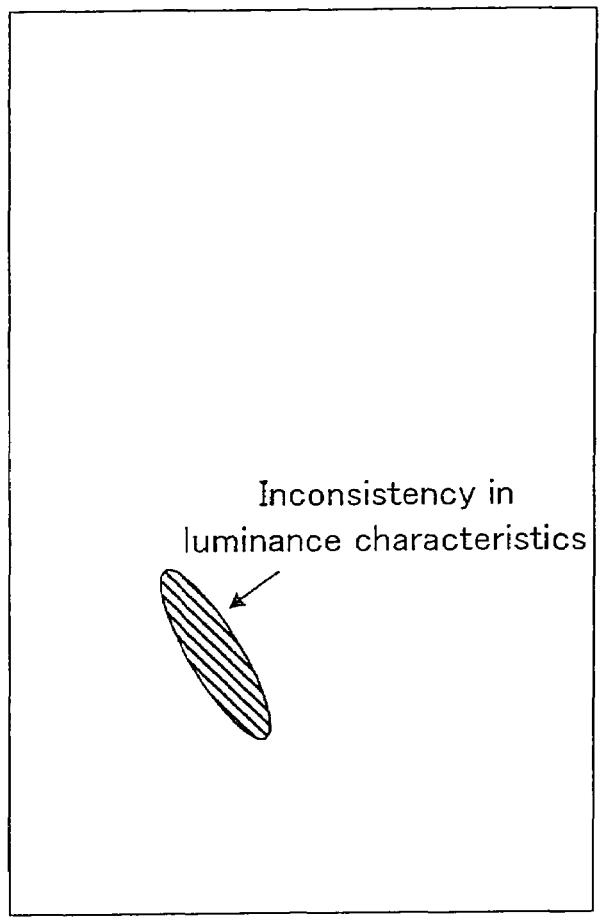
FIG. 5 is a diagram showing a captured image based on an output image data obtained at the image inspecting apparatus shown in FIG. 1.
Figure 6:
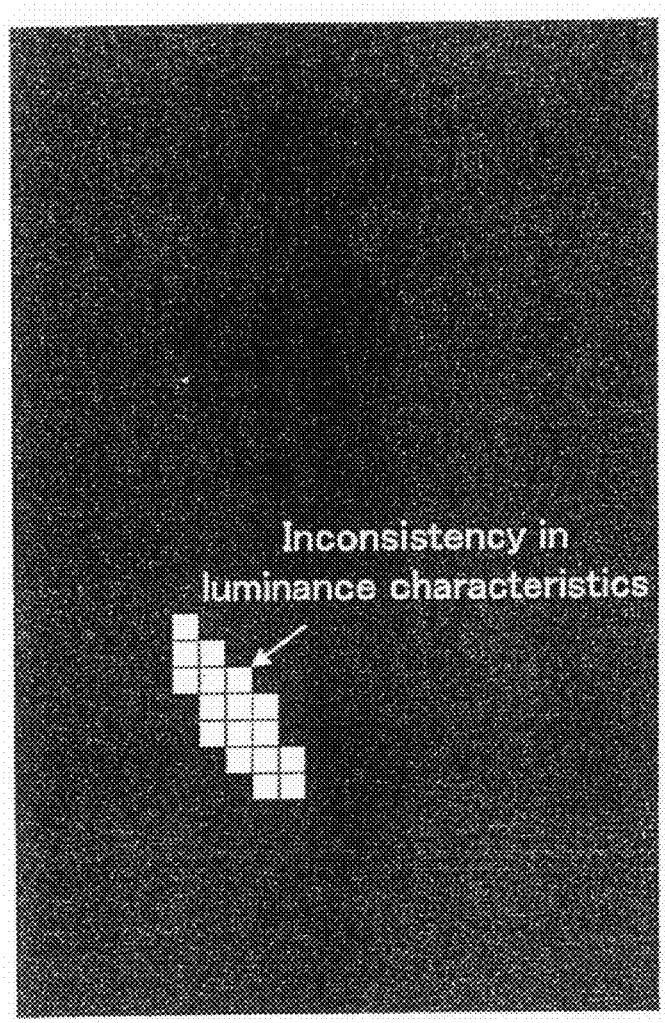
FIG. 6 is a diagram showing an example of image including blocks showing an "inconsistency in luminance characteristics".

For example, if "inconsistency in luminance characteristics" as shown in FIG. 5 is found, a block data which is determined to be "inconsistency in luminance characteristics" as shown in FIG. 6 is stored in the determination result storing memory 28.

When only the quality for the image sensor 11 is determined, the quality is determined by the quality determining section 27 with the following expression.

$$(Max-Ave)/(Ave-Min) > \text{limit\_1} \quad \text{(expression 1)}$$

Max: maximum value
Min: minimum value
Ave: average value
limit_2: value of the quality threshold 12.

The values limit_1 and limit_2 of the quality thresholds 12 are calculated from the correlation between the image of the object obtained by the imaging device and the result of observing the objects with eyes.

The quality result for the image sensor 11 is displayed as a display 31 in which a quality has been determined. For a quality determination result for the block, the contents stored in the determination result storing memory 28 is displayed as a display 32 of the determination result.

Hereinafter, the image inspecting apparatus 20 according to the present embodiment will be described in further details as one example in the case where a differential filtering with a central difference in the horizontal direction (4-coefficient) is used as the filtering processing section 22.

Figure 8:
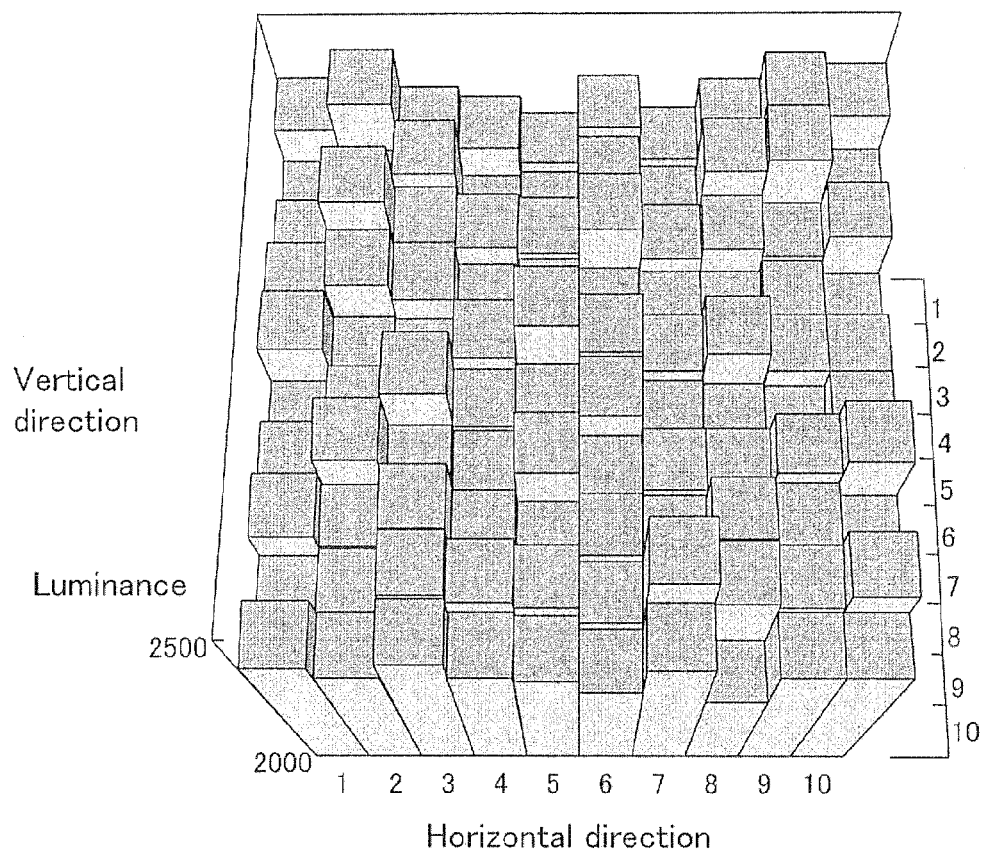
FIG. 8 is a graphical illustration in which the data distribution in FIG. 7 is represented in a three dimensional form.

FIG. 7 shows an example of a portion of an image data output from the image sensor 11. FIG. 8 is the graphical illustration in which the data distribution in FIG. 7 is represented in a three dimensional form. In FIG. 8, a lateral direction represents pixels on a screen in a horizontal direction and the longitudinal direction represents pixels on the screen in a vertical direction and shows luminance (2000-2500) in a direction perpendicular to the plane of the sheet.

A differential filtering is performed on the output image data based on the expression $Vnew(x)=|(V(x+2)+V(x+1)-V(x-1)-V(x-2))/2|$. In other words, the difference between two output image data values adjacent to the output image data value of interest and the difference between another two output image data values adjacent to the aforementioned two output image data values are added, and the resultant value is divided by 2 to obtain an absolute value.

When described with reference to the output image data in FIG. 7, from the left top in the figure, the numerical values for the luminance are 2408, 2450, 2392, 2376, 2350 . . . When the above-described differential filtering is performed on the numerical values, the amount of change in luminance is $|(2350+2376-2450-2408)/2|=|-132/2|=|-66|=66$. Likewise, when the same differential filtering is performed on adjacent output image data, the amount of change in luminance is $|2410+2350-2391-2450)/2|=41$.

FIG. 9 shows a shading component-removed data after a filtering process is performed with such a "differential filtering with a central difference in horizontal direction (4 coefficient)".

Figure 10:
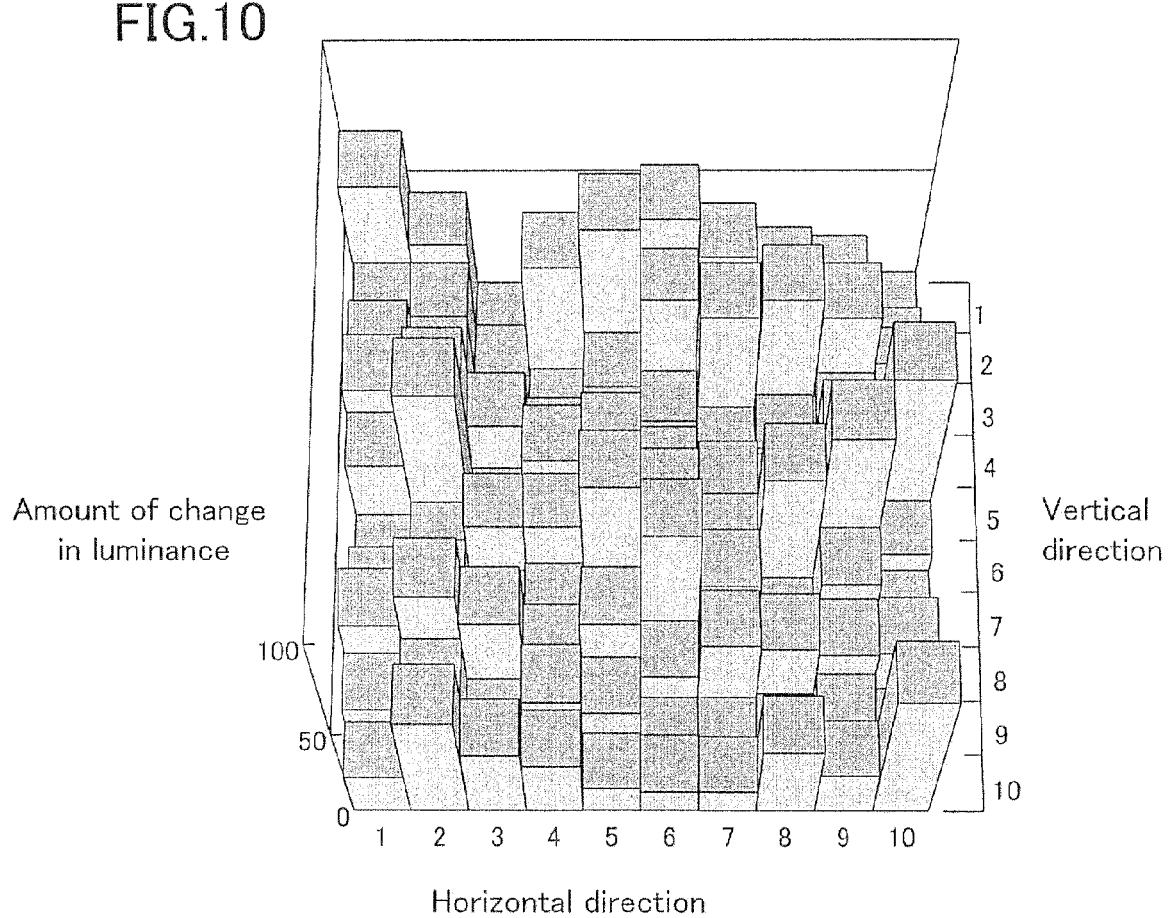
FIG. 10 is a graphical illustration in which the data distribution in FIG. 9 is represented in a three dimensional form.

FIG. 10 is a graphical illustration in which the data distribution in FIG. 9 is represented in a three dimensional form. In FIG. 10, a lateral direction represents pixels on a screen in a horizontal direction, and a longitudinal direction represents pixels on the screen in a vertical axis and shows an amount of change in luminance (0 to 100) in a direction vertical to a plane of sheet.

FIG. 11 shows an example of a block divided/added data where the shading component-removed data is divided into blocks with a size of 20×20, and the sum (sum of 400 data equivalent to "66, 41, 0, 18, 44 . . . " in FIG. 9) of the shading component-removed data is calculated for each block.

The following average value, the maximum value and the minimum value are calculated with the block divided/added data in FIG. 11.

Average value: 11986.07
Maximum value: 24021
Minimum value 9716

When the value limit_2 of the quality threshold 12 is set up to twice as much amount as the difference between the minimum value and the average value, Blk>3×Ave−2×Min=3×11986.07−2×9716=16526.21 according to the expression $(Blk-Ave)/(Ave-Min) > 2$. Thus, if the sum of the added data within the block exceeds 16527, the block is determined to be a poor quality.

Figure 12:
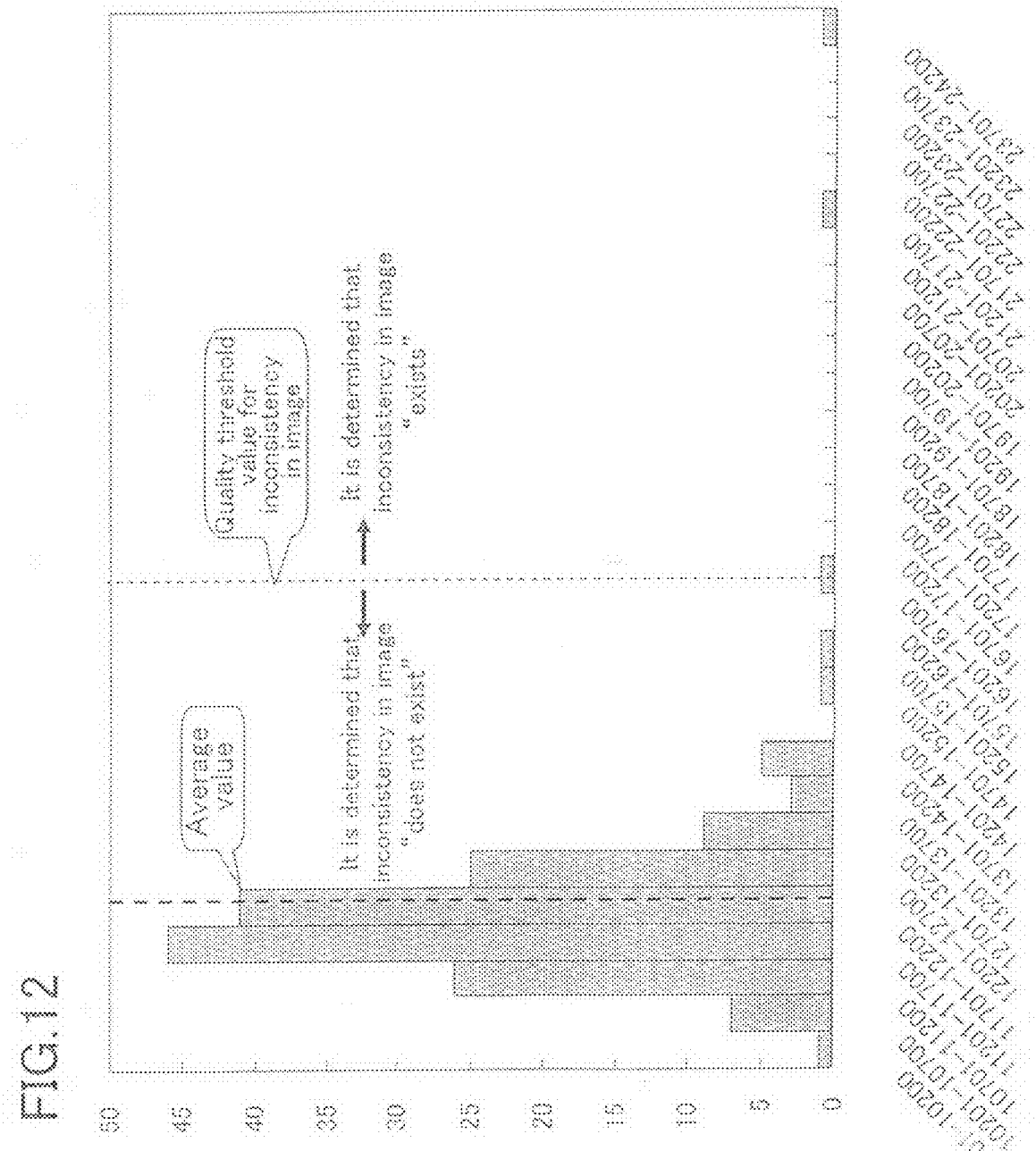
FIG. 12 is a histogram showing a data distribution based on FIG. 11.

FIG. 12 is a histogram showing a data distribution based on FIG. 11. A dashed line in the figure shows a boundary of a quality threshold value. In FIG. 12, a horizontal axis represents a value of a block divided/added data for each block and a vertical axis represents the number of the blocks. In FIG. 12, the number of blocks in which the sum of the added data within the block exceeds 16527 is three.

Figure 13:
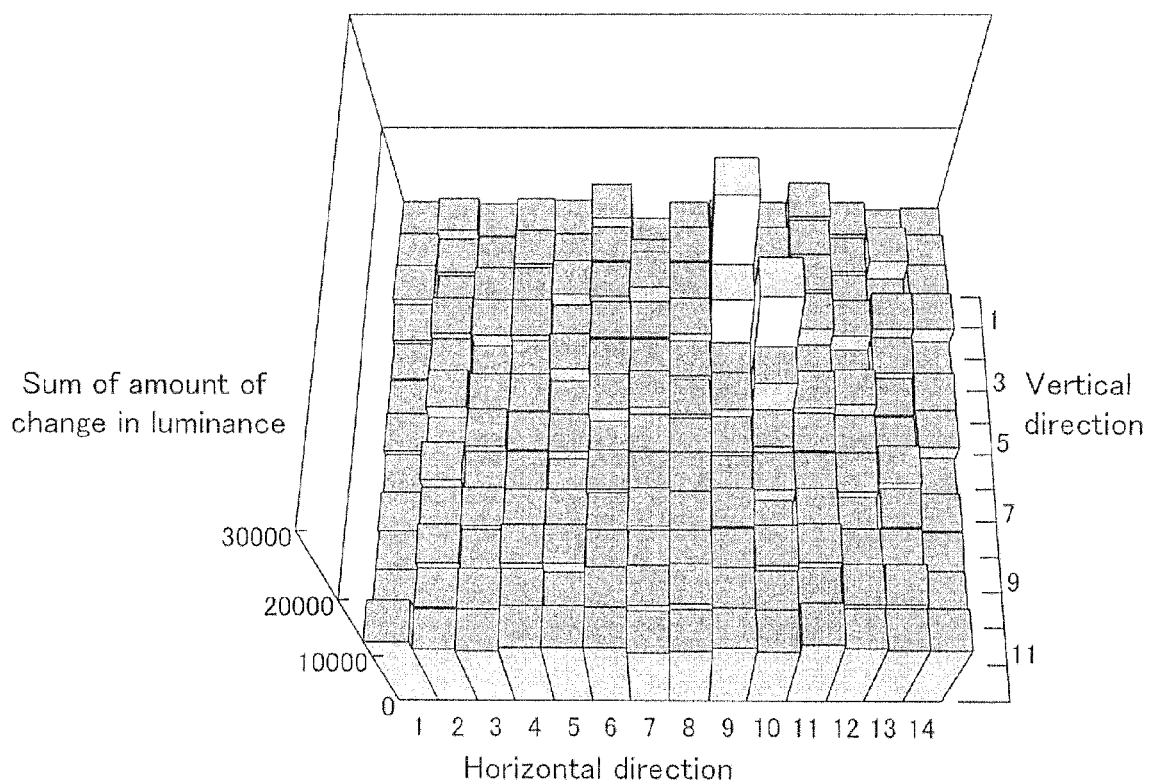
FIG. 13 is a diagram showing a block which has been determined to have inconsistencies in luminance characteristics by the quality determination.

Defect blocks are extracted as shown in the three dimensional graph shown in FIG. 13. In FIG. 13, a horizontal axis represents blocks in a horizontal direction and a vertical axis represents blocks in a vertical direction. The sum (0 to 3000) of the amount of change in luminance for each block is shown in a direction vertical to a plane of sheet. Blocks with a white surface are defect blocks and blocks with a black surface are blocks of acceptable quality.

When the existence of any "inconsistencies in luminance characteristics" for the image sensor 11 are checked, the expression applies $(Max-Ave)/(Ave-Min)=(24021-11986.07)/(11986.07-9716)=12034.93/2270.07=5.30>2$. The "difference between the maximum value and the average value" for the block added/divided data is greater than twice the "difference between the minimum value and the average value" for the block added/divided data. Thus, it is determined that "inconsistencies in luminance characteristics" are found in the image sensor 11.

The quality threshold values limit_1 and limit_2 are calculated from the correlation between the image of the object obtained by the imaging device and the result of observing the objects with eyes. However, the quality threshold values limit_1 and limit_2 are preferably within a range from 1.5 to 2.5. More preferably, the quality threshold values limit_1 and limit_2 are a value of 2, as described. When the quality threshold values limit and limit_2 are smaller than 1.5, there is an increasing probability that an image sensor or a block with a "good quality" is determined to be a "poor quality". When the quality threshold values limit_1 and limit_2 are larger than 2.5, there is an increasing probability that an image sensor or a block with a "poor quality" is determined to have a "good quality".

An image inspecting method using the image inspecting apparatus 20 according to the present embodiment may be constructed of hardware (circuit configuration). However, the image inspecting method can be implemented by software as well. A basic structure in that case is shown in FIG. 14.

Figure 14:
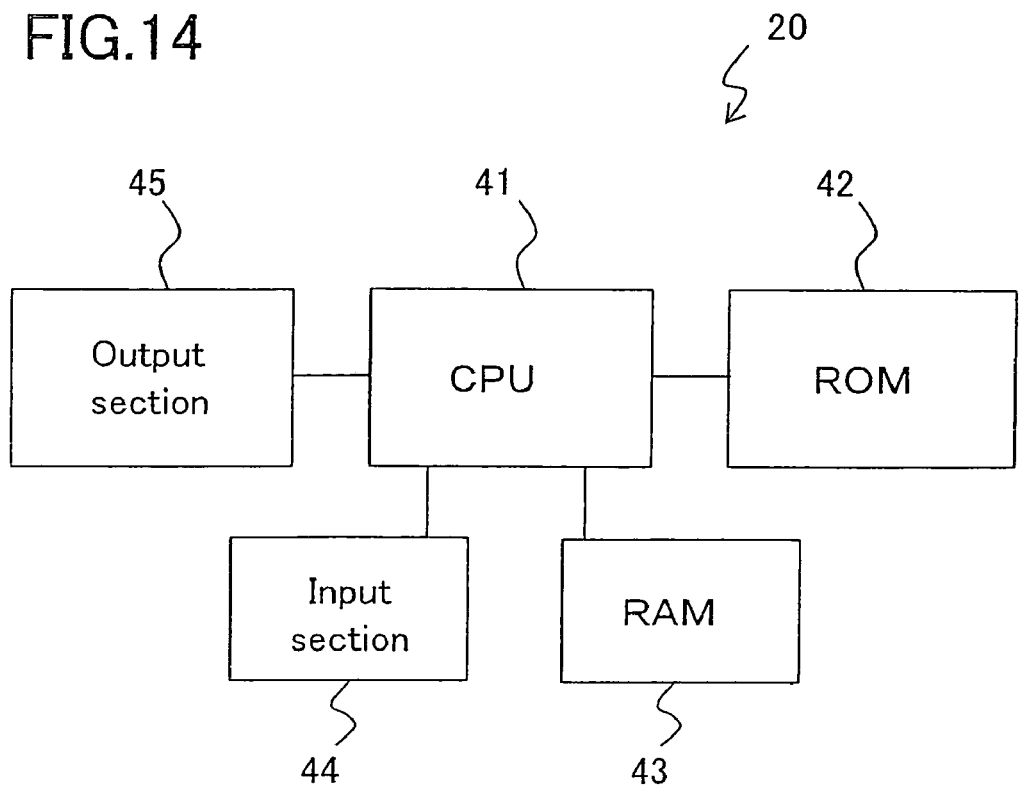
FIG. 14 is a block diagram showing an exemplary structure an image inspecting apparatus, wherein the image inspecting apparatus shown in FIG. 1 is implemented by a computer.

FIG. 14 is a block diagram showing an exemplary structure to realize the image inspecting apparatus 20 according to the present embodiment implemented by software.

As shown in FIG. 14, the image inspecting apparatus 20 includes a CPU (Central Processing Unit) as a processing section (controlling section), a ROM 42 as a computer-readable recording medium such as an optical disk (CD), a magnetic disk, a hard disk, an external storage device, etc, a RAM 43 that is used as a working memory by the CPU 41, an input section 44 including a keyboard, a mouse, etc, and an output section 45 including a display, a printer, etc.

The CPU 41 receives an image data output from the image sensor 11 and determines a quality for the "inconsistencies in luminance characteristics" as described above in accordance with the control program of the present invention, which is read from the ROM 42 onto the RAM 43.

The RAM 42 is also used as the original image storing memory 21, the preliminary processing memory 23, the secondary processing memory 25 and the determination result storing memory 28. The image data output from the image sensor 11, the shading component-removed data output by the filtering processing section 22, the block divided/added data obtained by the block dividing/added section 24 and the information about the block, which has been determined, obtained by the quality determination are also stored in the RAM 42.

The values limit_1 and limit_2 of the quality thresholds 12 are calculated from the correlation between the image of the object obtained by the imaging device and the result of observing the objects with eyes and input by an operator via the input section 44.

The quality result for the image sensor 11 is output to the output section 45 as a display 31 in which a quality has been determined and displayed there. For a quality determination result for the block, the contents stored in the memory 28 are output to the output section 45 and displayed there as a display 32 of the determination result.

Thus, the CPU 41 performs the following steps in accordance with the control program; a filtering processing step for obtaining a shading component-removed data from the image data output from the image sensor 11, a block dividing/adding step for dividing the shading component-removed data into respective blocks with a predetermined size of n×m (where m and n are natural numbers) and adding the shading component-removed data within the divided blocks to obtain a block divided/added data, a statistics processing step for calculating an average value, a maximum value and a minimum value for the block divided/added data and a quality determining step for determining a quality for the image data output from the image sensor 11 with the average value, the maximum value and the minimum value for the block divided/added data.

In this manner, according to the example embodiment presented herein, the image inspecting apparatus 20 includes the original image storing memory 21 for the image data output from the image sensor 11, the filtering processing section 22 for obtaining the shading component-removed data from the output image data, the preliminary processing memory 23 for storing the shading component-removed data, the block dividing/adding section 24 for dividing the shading component-removed data into respective blocks with a predetermined size of n×m and adding the shading component-removed data within the respective blocks to obtain the block divided/added data, the secondary memory 25 for storing the block divided/added data, the statistics processing section 26 for calculating a average value, a maximum value and a minimum value for the block divided/added data, the quality determining section 27 for determining a quality for the data with the calculated average value, the maximum value and the minimum value and the determination result storing memory 28 for storing the information about the block which been determined. Thereby, "inconsistencies in luminance characteristics" for an image data output from an image sensor are accurately and quantitatively detected at a high speed to determine if it is in an acceptable range, irrespective of a size of area and the number of "inconsistencies in luminance characteristics" by using a simple statistics processing without performing a labeling processing.

In the present embodiment, the filtering processing step (filtering processing section 22) is provided. However, the present embodiment is not limited to this. In the case where an image data output from the image sensor 11 does not have any shading or little shading, "inconsistencies in luminance characteristics" are accurately and quantitatively detected at a high speed to determine if it is in an acceptable range, irrespective of a size of area and the number of "inconsistencies in luminance characteristics" without providing a filtering processing step (filtering processing section 22), thereby the feature of the present embodiment being achieved.

In the present embodiment, the original image storing memory 21, the filtering processing section 22, the preliminary processing memory 23, the block dividing/adding section 24, the secondary processing memory 25, the statistics processing section 26, the quality determining section 27 and the determination result storing memory 28. However, the present embodiment is not limited to this. The present embodiment may be constructed of a filtering processing section, a block dividing/adding section, a statistics processing section and a quality determining section 27. Each memory may or may not be included in each section.

As described above, the technology presented herein is illustrated by using preferred embodiments. However, the present technology is not limited to the embodiments. It is understood that the scope of the present technology is only construed by the scope of the claim. It is understood that those skilled in the art can arrive at an embodiment of an equivalent scope based on the description of the present embodiment and common general technical knowledge from the description of the specific preferred embodiments of the present technology. It is understood that the contents of the patent publications, the published applications and the documents cited in the present specification, and cited as references for the present application and are incorporated by reference herein.

According to the present embodiment, in the field pertaining to an image inspecting apparatus having such function as processing an image data output from an image sensor (e.g. a CCD), an image inspecting method, a control program for making a computer to execute a processing procedure implementing the image inspecting method and a computer-readable storage medium stored thereon the control program, "inconsistencies in luminance characteristics" for the image data output from the image sensor are accurately and quantitatively detected at a high speed to determine if it is in an acceptable range, irrespective of a size of area and the number of "inconsistencies in luminance characteristics" by using a simple statistics processing without performing a labeling processing.

Various other modifications will be apparent to and can be readily made by those skilled in the art without departing from the scope and spirit of the example embodiment presented herein. Accordingly, it is not intended that the scope of the claims appended hereto be limited to the description as set forth herein, but rather that the claims be broadly construed.

What is claimed is:

1. An image inspecting apparatus for determining a quality for an image data output from an image sensor, the image inspecting apparatus comprising:
   a block dividing/adding section for dividing the image data output from the image sensor into blocks with a predetermined size of n×m (where m and n are natural numbers) and adding the image data within the divided blocks to obtain a block divided/added data;
   a statistics processing section for calculating an average value, a maximum value and a minimum value for the block divided/added data; and
   a quality determining section for determining a quality for the image data output from the image sensor based on whether or not at least one of a difference between the maximum value and the average value or a difference between the block divided/added data for an arbitrary block and the average value is greater than a quality threshold value multiplied by the difference between the minimum value and the average value, said average value, said maximum value and said minimum value for the block divided/added data being calculated by the statistics processing section, wherein
   the block dividing/adding section, the statistics processing section and the quality determination section are configured as a circuit.

2. An image inspecting apparatus according to claim 1, further comprising a filtering processing section for obtaining a shading component-removed data in which the shading component is removed from the image data output from the image sensor, prior to the block dividing/adding section and wherein the block dividing/adding section divides the shading component-removed data into respective blocks with a predetermined size of n×m (where m and n are natural numbers) and adds the shading component-removed data within the divided blocks to obtain a block divided/added data.

3. An image inspecting apparatus according to claim 2, wherein the filtering process section obtains the shading component-removed data with any one of a differential filtering with a central difference in a horizontal direction, a differential filtering with a central difference in a vertical direction, a 4-coefficient Laplacian filtering, an 8-coefficient Laplacian filtering and a differential filtering with a central difference in three directions.

4. An image inspecting apparatus according to claim 1, wherein the quality determining section determines a quality for the image sensor with $$(Max-Ave)/(Ave-Min) > limit\_1$$

where
Max: maximum value for the block divided/added data,
Min: minimum value for the block divided/added data, and
Ave: average value for the block divided/added data
limit_1: threshold value for determining the quality.

5. An image inspecting apparatus according to claim 1, wherein the quality determining section determines a quality for the block with $$(Blk-Ave)/(Ave-Min) > limit\_2$$

where
Blk: the block divided/added data for an arbitrary block,
Min: minimum value for the block divided/added data,
Ave: average value for the block divided/added data, and
limit_2: threshold value for determining the quality.

6. An image inspecting apparatus according to claim 5, wherein the threshold value for determining the quality is within a range from 1.5 to 2.5.

7. An image inspecting apparatus for determining a quality for an image data output from an image sensor, the image inspecting apparatus comprising:
   an original image storing memory section for storing the image data output from the image sensor;
   a filtering processing section for obtaining a shading component-removed data in which the shading component is removed from the output image data stored in the original image storing memory section;
   a preliminary processing memory section for storing the shading component-removed data obtained by the filtering processing section;
   a block dividing/adding section for dividing the shading component-removed data stored in the preliminary processing memory section into blocks with a predetermined size of n×m (where m and n are natural numbers) and adding the shading component-removed data within the divided blocks to obtain a block divided/added data;
   a secondary processing memory section for storing the block divided/added data obtained by the block dividing/adding section;
   a statistics processing section for calculating an average value, a maximum value and a minimum value for the block divided/added data stored in the secondary processing memory section;
   a quality determining section for determining a quality for the image data output from the image sensor based on whether or not at least one of a difference between the maximum value and the average value or a difference between the block divided/added data for an arbitrary block and the average value is greater than a quality threshold value multiplied by the difference between the minimum value and the average value, said average value, said maximum value and said minimum value for the block divided/added data being calculated by the statistics processing section, and
   a determination result storing memory section for storing information about the block which has been determined by the quality determining section, wherein
   the block dividing/adding section, the statistics processing section and the quality determination section are configured as a circuit.

8. An image inspecting apparatus according to claim 7, wherein the filtering process section obtains the shading component-removed data with any one of a differential filtering with a central difference in a horizontal direction, a differential filtering with a central difference in a vertical direction, a 4-coefficient Laplacian filtering, an 8-coefficient Laplacian filtering and a differential filtering with a central difference in three directions.

9. An image inspecting apparatus according to claim 7, wherein the quality determining section determines a quality for the image sensor with (Max−Ave)/(Ave−Min)>limit_1 where
Max: maximum value for the block divided/added data,
Min: minimum value for the block divided/added data,
Ave: average value for the block divided/added data, and
limit_1: threshold value for determining the quality.

10. An image inspecting apparatus according to claim 7, wherein the quality determining section determines a quality for the block with (Blk−Ave)/(Ave−Min)>limit_2 where
Blk: the block divided/added data for an arbitrary block,
Min: minimum value for the block divided/added data,
Ave: average value for the block divided/added data, and
limit_2: threshold value for determining the quality.

11. An image inspecting apparatus according to claim 10, wherein the threshold value for determining the quality is within a range from 1.5 to 2.5.

12. An image inspecting method for determining a quality for an image data output from an image sensor, the image inspecting apparatus comprising: using a processor to perform, block dividing/adding for dividing the image data output from the image sensor into blocks with a predetermined size of n×m (where m and n are natural numbers) and adding the image data within the divided blocks to obtain a block divided/added data;

statistics processing for calculating an average value, a maximum value and a minimum value for the block divided/added data; and quality determining for determining a quality measure for the image data output from the image sensor with the average value, the maximum value and the minimum value for the block divided/added data, based on whether or not at least one of a difference between the maximum value and the average value or a difference between the block divided/added data for an arbitrary block and the average value is greater than a quality threshold value multiplied by the difference between the minimum value and the average value, wherein the determined quality measure for the image data output from the image sensor is displayed on a display device.

13. An image inspecting method according to claim 12, further comprising filtering processing for obtaining a shading component-removed data in which the shading component is removed from the image data output from the image sensor, prior to the block dividing/adding and wherein the block dividing/adding divides the shading component-removed data into respective blocks with a predetermined size of n×m (where m and n are natural numbers) and adds the shading component-removed data within the divided blocks to obtain a block divided/added data.

14. A control program recorded on a computer readable recording medium for making a computer to execute a processing procedure implementing the image inspecting method according to claim 12.

* * * * *